United States Patent [19]
Castle

[11] 4,276,332
[45] Jun. 30, 1981

[54] FIRE PROOF CABLE TRAY ENCLOSURE

[76] Inventor: George K. Castle, 1047 E. Lakeview Dr., Baton Rouge, La. 70808

[21] Appl. No.: 91,839

[22] Filed: Nov. 6, 1979

[51] Int. Cl.³ ............................ B32B 3/20; B32B 3/24
[52] U.S. Cl. .......................................... 428/36; 52/232; 138/149; 174/68 C; 428/76; 428/256; 428/290; 428/332; 428/339; 428/920; 428/921
[58] Field of Search ................ 174/68 C, 48; 169/48; 428/920, 921, 36, 68, 75, 76, 256, 290, 332, 339; 52/232; 138/140, 145, 149, 157, 177

[56] References Cited

U.S. PATENT DOCUMENTS

| | | | |
|---|---|---|---|
| 1,306,142 | 6/1919 | Fitzgerald | 174/68 C |
| 4,054,711 | 10/1977 | Botsolas | 428/228 |
| 4,064,359 | 12/1977 | Peterson et al. | 428/921 |
| 4,069,075 | 1/1978 | Billing et al. | 156/71 |
| 4,093,818 | 6/1978 | Thwaites et al. | 174/68 C |
| 4,135,055 | 1/1979 | Beckers et al. | 169/48 |

FOREIGN PATENT DOCUMENTS 2536565 2/1977 Fed. Rep. of Germany ........ 174/68 C Primary Examiner—Paul J. Thibodeau
Attorney, Agent, or Firm—Vinson & Elkins

[57] ABSTRACT

A fire proof cable tray constructed of assemblable units, each of which comprises a metal frame having a wire mesh covering attached thereto, an intumescent coating encapsulating the wire mesh, a layer of an inorganic, non-combustible fiber mat and a sheet of metal foil. The foil, fiber mat and encapsulated screen are mechanically secured together. The units can be assembled on the job site to form a cable tray for protecting control lines in a refinery or chemical plant.

11 Claims, 4 Drawing Figures

U.S. Patent
Jun. 30, 1981
4,276,332
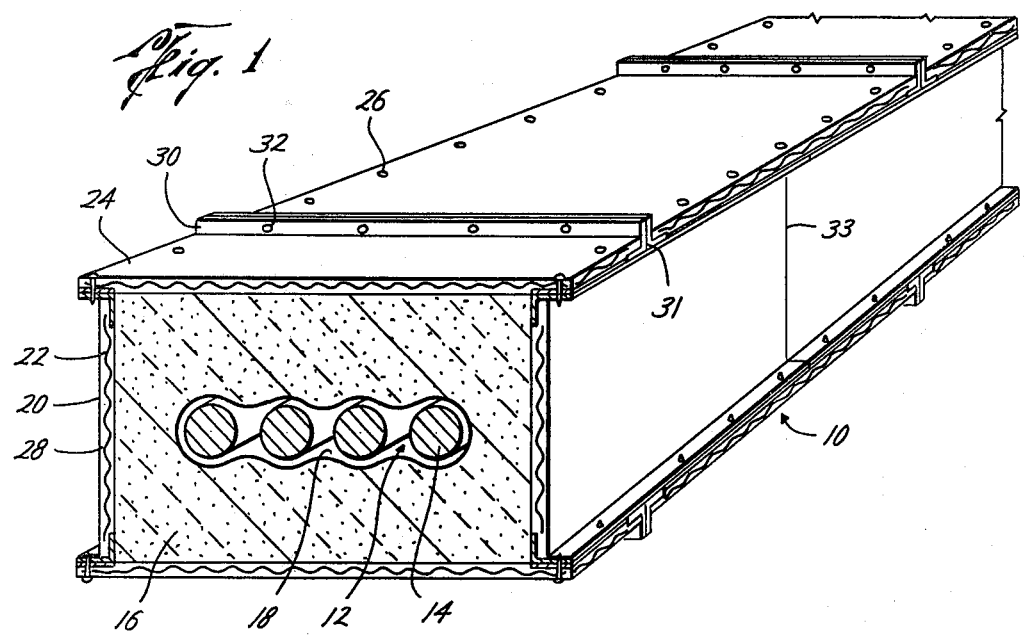
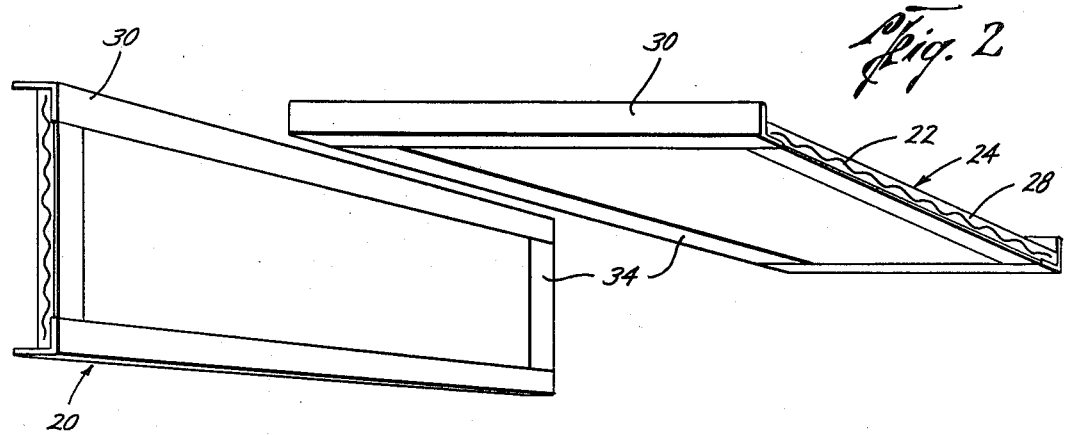
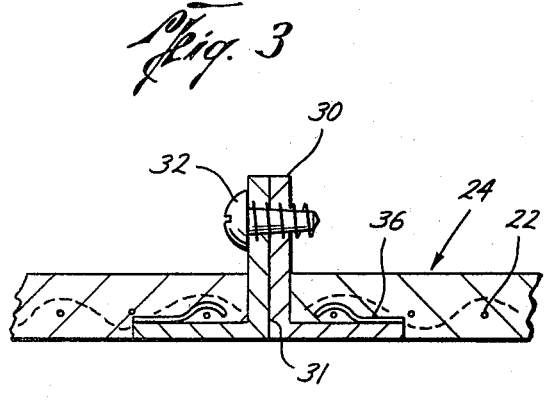
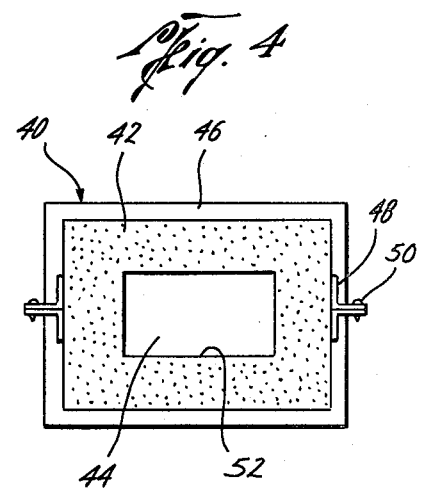

FIRE PROOF CABLE TRAY ENCLOSURE

BACKGROUND OF THE INVENTION (1) Field of the Invention

The invention is directed to a fire proof cable tray for carrying operating control tubes and instrumentation lines in refineries and chemical plants.

(2) Prior Art

There has long been a need for fire proofing operating control cables and instrumentation lines in oil refineries and chemical plants. Often in gasoline, fuel oil, and similar types of fires the temperature in the fire environment exceeded 2200° F., with heat flux levels up to 26 Btu per square foot second. Because of the high flammability of products being stored and transported, protection against high temperature petroleum flash fires for extended periods of time is essential.

It is necessary that control cables and instrumentation lines must be made to withstand high temperatures, in the fires, for periods of time from 15 to 20 minutes, or more, to permit an orderly shutdown to isolate the system and the fire extinguished with a minimum of damage to the control system.

Use of fire retardant coating systems for the control cables and instrumentation lines does not provide for adequate protection in hot fires, or for extended burning times. These cables and electrical lines are usually distributed throughout the plant and are generally all conducted through "trays", called cable trays, rather than through metal conduits. The cables and lines are simply laid out in these trays throughout the plant.

The advantage of the cable tray system is that repair work and adding new lines is often simplified, due to the easy access to the tray and its contents. A disadvantage is that, in the tray, the fire hazard is increased because of the number of cables set side by side, as well as the combustible debris which may collect in the suspended trays.

Other investigators have attempted to provide cable tray systems which provide fire protection for extended periods of time, i.e., in excess of 15 minutes. Most have concentrated on systems which merely stack layers of non-burning, insulating material either inside or outside the cable tray. For example, U.S. Pat. No. 4,064,359 discloses use of a two-layer blanket of fibers. The inner layer consists of glass fibers. The layer is coated with a halogen-containing coating containing 3 to 75% fireproof fibers, such as asbestos.

U.S. Pat. No. 4,054,711 teaches a jacketing material having a polyester film, aluminum coating, asbestos paper, glass cloth and an outer layer of polyvinyl fluoride film. The fire-proof wrap material is used in a manner similar to the '359 patent. A cable coating which may be sprayed on is taught in U.S. Pat. No. 3,928,210. The slurry for spraying consists of non-combustible fibers in a water based resinous emulsion. U.S. Pat. No. 4,058,643 teaches use of an intumescent adhesive layer in fire retardant laminates. The inventor uses an intumescent adhesive to secure a polyethylene film to insulation batting. Two other patents of interest are U.S. Pat. No. 4,069,075 and U.S. Pat. No. 4,112,179.

It is an object of the invention to provide a cable tray construction to provide a fire protective insulating product capable of protecting control cables and instrumentation lines, contained therein, from external fire temperatures of at least 2200° F. for a period of time in excess of 15 minutes.

It is a further object to provide an easily assembled, prefabricated cable tray capable of protecting the cables and lines secured therein from fire temperatures of 2200° F. and higher for a period of time in excess of 15 minutes.

Another object is to provide the above cable tray which is adaptable for encasing cables and lines and also encasing structural beams in a refinery or plant.

SUMMARY OF THE INVENTION

These and other objects are accomplished by providing a fire protective insulating product having an assemblable unit comprising:

(a) an essentially rectangular metal frame, (b) said frame supporting a wire mesh which is secured to said metal frame, (c) a coating of an intumescent material encapsulating said wire mesh; and (d) secured to one surface thereof, a layer containing an insulative inorganic non-combustible fiber.

The prefabricated, assemblable units are preferably assembled at the job site to form a fire-proof cable tray having joints, on its joining sides, which offset from each other to eliminate joints which are continuous around the covers and to provide rigidity to the system.

BRIEF DESCRIPTION OF THE DRAWINGS

FIG. 1 is a fragmentary perspective view of the assembled cable tray of the invention, showing cables installed therein;

FIG. 2 is a perspective view of the upper and a side assemblable unit, without the insulative fiber layer attached thereto;

FIG. 3 is a cross-sectional view of a portion of two upper assemblable units joined together; and FIG. 4 is a cross-sectional view of another embodiment of the present cable tray having only two assemblable units.

DESCRIPTION OF THE PREFERRED EMBODIMENTS

The basic, prefabricated assemblable unit of the present invention is best illustrated in FIGS. 2 and 3. The basic, essentially rectangular frame for the unit consists of metal angle units 30 which are secured to metal support strips 34. Upper and lower units 24 have the angle pieces 30 positioned transverse to intended direction of assembly, as seen in FIG. 2, and particularly in FIG. 1, which shows an assembled cable tray of the invention.

The side units 20 preferably have the metal angle 30 extending longitudinally of the direction of installation. Thus, when assembled, the cable tray may be more rigidly secured in place with the ability to withstand load stresses normally encountered in the field. The metal angle pieces 30 are preferably galvanized, as are the support strips 34.

A wire screen or mesh 22 is layed on and secured to the frames (angle 30 and support strips 34) and secured thereto by folding over a strand of the wire a tab 36 punched from the support strip 34. It will be appreciated, of course, that other means may be used to secure the wire 22 to the frame. The punch tab 36 is merely an economical method of attachment which has been found to be particularly well suited for the present assemblable unit. Tests of the unit have shown that the wire 22 will remain firmly attached to the frame under anticipated stresses, using the punch tab 36 attachment method.

The wire mesh is impregnated with a substantial coating 28 of an intumescent material. Experimentation has revealed that a layer of as little as three-sixteenth's inch provide sufficient intumescent properties to protect the interior of the assembled cable tray from fire termperatures exceeding 2200° F. for periods of at least 20 minutes.

The intumescent coating 28 material found most suitable by the inventor is Chartek 59, sold by Avco Corporation, of Lowell, Mass. Chartek 59 is a combination ablative and intumescent epoxy compound which handles the high intensity energy of a fire in several ways. First, as the temperature is raised, decomposition with attendant absorption of energy occurs. During this process, the material swells to about five times its original thickness into a high temperature carbonaceous foam reducing the flow of energy of the mineral wool insulation layer 16 which is attached next to the frame.

As time progresses in the fire, the surface temperature of the carbon foam increases until 90% of the energy reaching the surface is rejected through reradiation. The net effect of these heat transfer processes is to dramatically reduce the amount of energy that the mineral wool insulation 16 must handle.

The mineral wool insulation layer 16 is preferably attached to the side of the frame that will be inside the finished cable tray, as shown in FIG. 1. While the preferred layer of insulation 16 is mineral wool, similar insulative inorganic noncombustible fiber mats would be equally suitable. However, it has been found that mineral wool is especially well suited in forming the prefabricated units of the present invention. The preferred density of the insulation layer 16 is about 8 pounds per cubic foot (pcf).

It has also been found that a thin, aluminum or other metal foil layer 18 is advantageously secured to the surface of the mineral wool layer 16. When in place, the metal foil layer 18 will be in contact with cables 14 which lie in the cable tray cavity 12.

The units 20 and 24 are assembled, at the job site, into a finished cable tray 10 essentially as illustrated in FIG. 1. The angle pieces 30 are secured together by screws 32 or other suitable fasteners. In like manner, the side units 20 are joined to the top and bottom units 24 by screws 26, or other suitable fasteners.

When assembled, the mineral wool layers 16 form an insulating layer having an internal cavity 12 for installing the control cables and/or instrumentation lines 14. A particularly well suited structure, as shown in FIG. 1, is assembled in a manner where the unit joints 31 and 33 do not form a continuous line around the circumference of the cable tray. When thus assembled, it is very easy to remove a unit for maintenance of the cables and lines and still maintain the desired rigidity of the cable tray.

When the cable tray 10 is fully assembled, it is helpful to seal the upper 31 and side 33 joint with the Chartek 59, using either caulking or spraying procedures to provide a water tight seal.

FIG. 4 illustrates another embodiment of the present invention where there would be only two units 46 to form a boxlike cable tray 40. These units 46 would be essentially U-shaped, but would be constructed using the same basic components as the units 20 and 24 shown in FIGS. 1 and 2. The cable tray 40 would comprise the frame-wire mesh-intumescent assembly 46 having a layer of inorganic, non-combustible fiber 42. A final layer of metal foil 52 serves as the lining for the cavity 44 in which are laid the control cables and instrumentation lines (not shown). the two U-shaped units 46 are then connected at the metal angle pieces 48 with fasteners 50. The upper (and lower) unit 24 shown in FIG. 2 could be bent to form a unit 46 suitable for assembly as shown in FIG. 4.

In addition, using units 20 and 24 similar to those shown in FIG. 2, it is possible to construct six-sided enclosures for valves, electrical junction boxes, and similar equipment which needs to be protected in a fire to enable the orderly shut down of a unit which is on fire.

As will be recognized by those skilled in the art, the specific materials described hereinabove may have suitable alternatives. The metal angles 30 may be galvanized or stainless steel. While they may be sometimes referred to as "angle iron", it is vital that the metal be such that it is essentially rust-free and not subject to excessive corrosion in the refinery environment.

Further, the wire mesh 22 should be sized to prevent the intumescent material from separating from same in its charred condition. Thus, it is generally recommended that the mesh openings be no greater than about one inch. Also, the wire strands should preferably be welded or twisted together, rather than woven, to reduce the likelihood of strand separation during a fire.

The Chartek 59 can be of virtually any thickness desired, depending on the intumescent protection required in any particular location. In like manner, while an 8 pcf density fiber layer 16 is preferred, other densities may be used, depending on insulation service requirements of a particular installation.

In a fire test of a cable tray 10 assembled in the manner shown in FIG. 1, using a 3/16 inch Chartek 59 unit, as described, and 8 pcf mineral wool layers at a recorded enironmental temperature exceeding 2200° F. and heat flux levels up to 26 Btu/ft.$^2$ sec., the interior temperature rise of the cable tray was limited to 64° F. The test was run for about 22 minutes using a mixture of gasoline and fuel oil as the energy source. This indicates that the system is capable of much longer protection, perhaps for periods exceeding 40–45 minutes. Inspection of the cable tray following the fire test revealed that there were no openings, joint failure or other defects of any kind.

What is claimed is:

1. A fire protective insulating product having an assemblable unit comprising:
    an essentially rectangular metal frame,
    said frame supporting and attached to a wire mesh,
    a coating of an intumescent material encapsulating said wire mesh, and
    secured to one surface of said encapsulated wire mesh, a insulative layer of an inorganic, non-combustible fiber.

2. The fire protective insulating product of claim 1, wherein the metal frame is adapted to be secured to a second assemblable unit.

3. The fire protective insulating product of claim 1, wherein the metal of said metal frame is resistant to corrosion.

4. The fire protective insulating product of claim 1, wherein the openings in said wire mesh do not exceed one inch, and
    the wires of said wire mesh are welded together.

5. The fire protective insulating product of claim 1, wherein the coating of said intumescent material encapsulating said wire mesh is of a thickness of at least three-sixteenth's inch.

6. The fire protective insulating product of claim 1, wherein the inorganic, non-combustible fiber is mineral wool.

7. The fire protective insulating product of claim 1, wherein the inorganic, non-combustible fiber is aluminum silicate.

8. A fire protective insulating product having an assemblable unit comprising:

an essentially rectangular galvanized metal frame, at least two opposite sides thereof being angularly shaped, a wire mesh covering at least one side of, and attached to, said metal frame, said wire mesh being encapsulated by at least three-sixteenth's inch intumescent material, an insulative layer of an inorganic, non-combustible fiber mat being attached to at least one side of said metal frame, and a metal foil layer secured to said assemblable unit as the last layer thereof.

9. The fire protective insulating product of claim 8, wherein the inorganic, non-combustible fiber mat is mineral wool and is attached to the side of said metal frame which is opposite said wire mesh and having a metal foil attached to the other side of said fiber mat.

10. A fire proof cable tray comprising a four-sided housing, each side of said housing consisting of at least one of said assemblable units claimed in claims 1 or 8.

11. A fire proof unit for housing a mechanical or electrical device, comprising a six-sided housing, each side of said housing consisting of at least one of said assemblable units claimed in claims 1 or 8.

* * * * *